(12) United States Patent
Weichholdt

(10) Patent No.: US 7,044,853 B2
(45) Date of Patent: May 16, 2006

(54) COMBINE WITH STRAW CHOPPER

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/729,690

(22) Filed: Dec. 5, 2003

(65) Prior Publication Data

US 2004/0137974 A1    Jul. 15, 2004

(30) Foreign Application Priority Data

Dec. 5, 2002   (DE)   .................. 102 56 744

(51) Int. Cl.
 *A01F 12/40* (2006.01)
(52) U.S. Cl. .................................... 460/112
(58) Field of Classification Search ................ 460/112, 460/111, 79, 78, 119, 901
See application file for complete search history.

(56) References Cited

U.S. PATENT DOCUMENTS

| | | | | |
|---|---|---|---|---|
| 3,712,309 | A * | 1/1973 | Schmitz ...................... | 460/112 |
| 4,617,942 | A * | 10/1986 | Garner ........................ | 460/112 |
| 4,637,406 | A * | 1/1987 | Guinn et al. ................. | 460/112 |
| 4,913,679 | A * | 4/1990 | Bender ........................ | 460/112 |
| 5,232,405 | A | 8/1993 | Redekop et al. | |
| 5,878,679 | A | 3/1999 | Gregor et al. ............. | 111/17.1 |
| 6,331,142 | B1 * | 12/2001 | Bischoff ...................... | 460/112 |
| 6,656,038 | B1 * | 12/2003 | Persson ........................ | 460/112 |
| 2002/0086722 | A1 * | 7/2002 | Kuhn et al. .................. | 460/100 |
| 2002/0119809 | A1 * | 8/2002 | Bognar et al. ............... | 460/112 |

FOREIGN PATENT DOCUMENTS

| | | |
|---|---|---|
| DE | 82 02 574 | 2/1982 |
| DE | 38 34 102 | 10/1988 |
| DE | 43 21 905 | 7/1993 |
| DE | 100 64 356 A1 | 7/2002 |
| EP | 0 212 270 | 7/1986 |
| EP | 0 702 892 | 3/1996 |
| EP | 0 727 135 A1 | 8/1996 |
| WO | 01/01754 A1 | 1/2001 |
| WO | 02/34029 A1 | 5/2002 |

OTHER PUBLICATIONS

New Holland CX Mahdrescher, printed in Italy on date 01/09, 4 pgs.
Case IH, "Cross-Flow", printed in Italy, CF80-D-BR-date Nov. 2000, 8 pgs.
Deutz-Fahr, "TopLiner 8 X L", printed in Germany, date unknown, 4 pgs.

* cited by examiner

*Primary Examiner*—Árpád Fábián Kovács

(57) ABSTRACT

A combine comprising a separating assembly providing a first crop residue stream, the first crop residue stream is directed to a straw guide element having a chopping mode position for directing the first crop residue stream to a straw chopper for chopping the first crop residue stream and a swath forming mode position for conveying the first crop residue stream around the straw chopper laying the first crop residue stream in a swath. The combine also comprises a cleaning assembly providing a second crop residue stream that engages a conveying assembly which mechanically conveys the second crop residue stream from the cleaning assembly to the straw chopper.

11 Claims, 3 Drawing Sheets

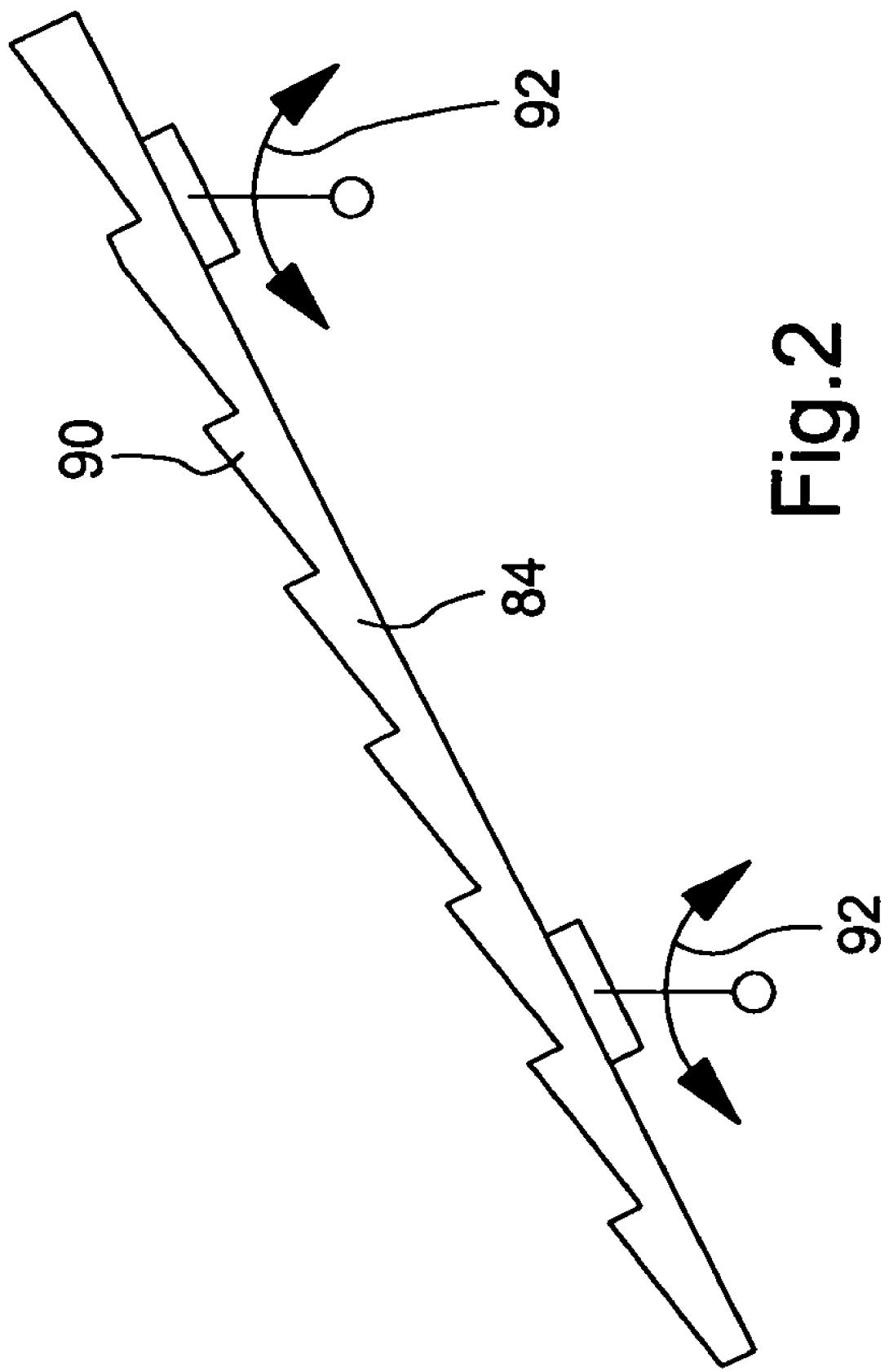

Fig.3a
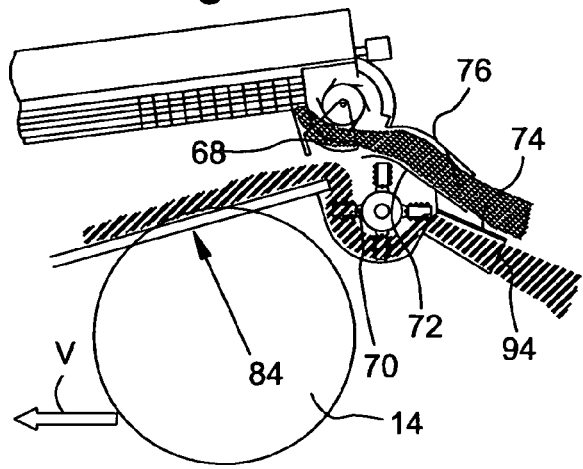
Fig.3b
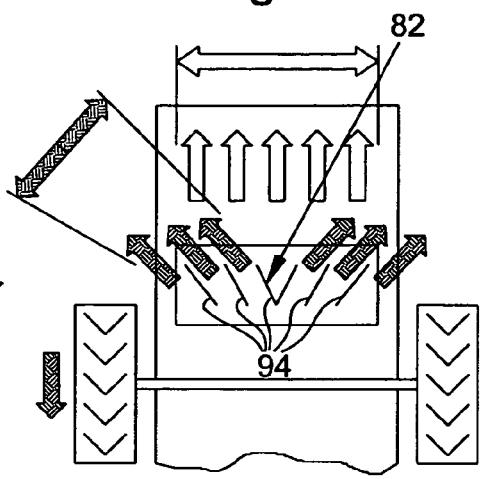
Fig.4a
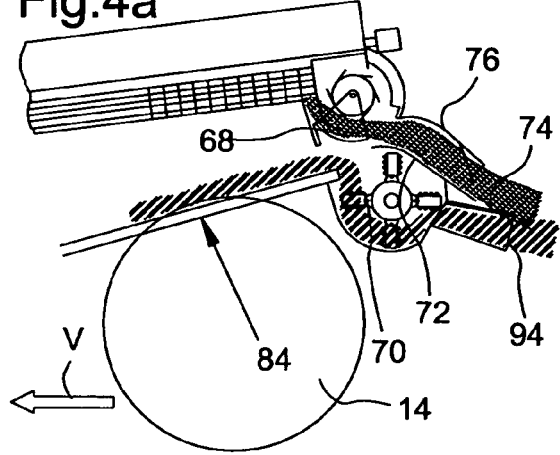
Fig.4b
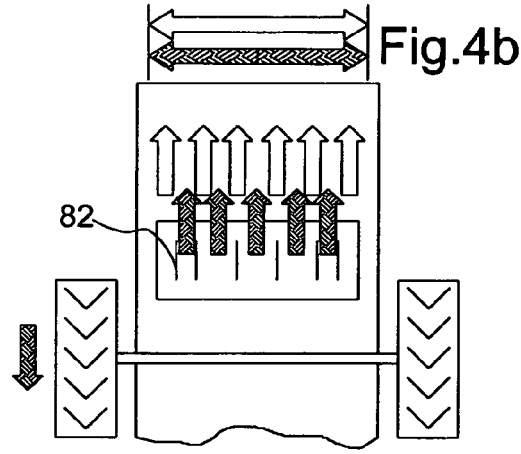
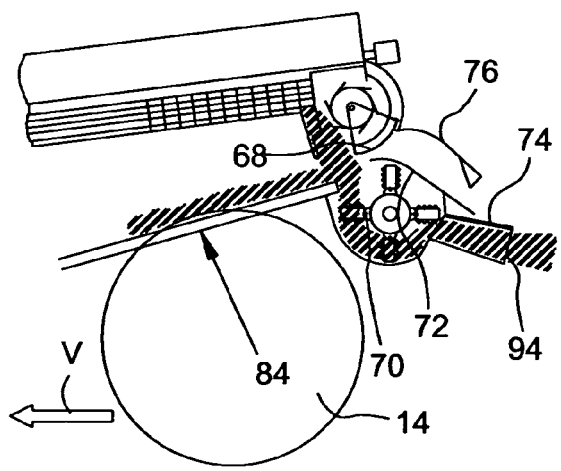
Fig.5a
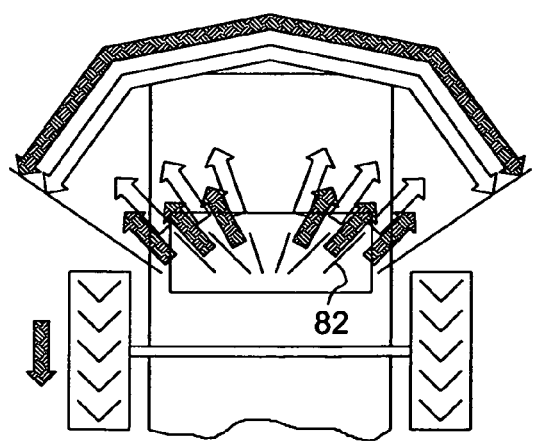
Fig.5b

COMBINE WITH STRAW CHOPPER

FIELD OF THE INVENTION

The present invention is directed to a combine having a separating assembly providing a first crop residue stream that can be fed to a straw chopper or conveyed around the straw chopper. The combine also comprises a cleaning assembly providing a second crop residue stream that can be fed by a mechanical conveying assembly to the straw chopper.

BACKGROUND OF THE INVENTION

EP 0 727 135 A describes a combine, in which the straw is laid down on the ground in a swath by straw walkers via a guide plate in a swath laying mode or fed to a straw chopper in a chopping mode, in which the straw is chopped and distributed on the field. The guide plate can be moved into a third position, in which the straw as well as the chaff can be conveyed through the straw chopper. The chaff is pneumatically conveyed into the straw chopper by means of blowers of the cleaning assembly.

WO 01/01754 A describes a combine with a straw chopper and a chaff spreader. The chaff spreader is able to throw the chaff into the straw upstream of the straw chopper such that it moves through the straw chopper together with the straw and is distributed on the field approximately over the operating width of the cutting mechanism. It is also possible to distribute the chaff over the operating width by means of the chaff spreader. In this case, the chaff is not moved through the straw chopper while the straw is chopped in the straw chopper and distributed on the field. If the straw is not chopped but rather conveyed around the front side of the straw chopper by a pivoted straw guide plate and laid down on the field, the chaff can be distributed on the field over the operating width of the cutting mechanism or blown into the straw swath.

WO 02/34029 A proposes a different chaff spreader arrangement. This chaff spreader is able to blow the chaff directly against straw guide plates arranged downstream of the straw chopper such that the chopped straw and the chaff are distributed over the operating width via the guide plates. In another operating mode, the straw is conveyed around the rear of the straw chopper and laid down on the field in the form of a swath, wherein the chaff is conveyed along the straw guide plates by the chaff spreader and distributed on the field over the operating width to both sides of the swath. In other operating modes, the straw is chopped by the straw chopper and distributed over the operating width or laid down in the form of a swath while the chaff is distributed by the chaff spreader over the operating width to both sides of the swath. In this arrangement, it is also possible to blow the chaff into the straw swath in the swath laying mode.

DE 100 64 356 A proposes to always convey the chaff through the straw chopper while the straw is either conveyed through the straw chopper in the chopping mode or around the rear side of the straw chopper in the swath laying mode and laid down on a field in the form of a swath. In the swath laying mode, the straw guide plates are moved into a position, in which the chaff is distributed over the operating width to both sides of the swath. In the swath laying mode, the chaff and the straw are distributed on the field over the operating width. In this case, the chaff is conveyed into the straw chopper by the blower of the cleaning assembly and the suction effect of the straw chopper.

Similar arrangements are known from the prospectuses "Deutz-Fahr Topliner 8XL," Imprint 91 532 01 Printed in Germany 9906, "Case IH Cross-Flow," Imprint CF80-D-BR-10/99, and New Holland CX Mähdrescher, Imprint Printed in Italy——01/09—Satiz Srl (Turin)—Cod. N. 12003/BR/D00. In these arrangements, the straw is either conveyed through the straw chopper, chopped and distributed over the operating width or conveyed around the rear side of the straw chopper and laid down on the field in the form of swaths. The chaff is conveyed into the straw chopper by the blowers of the chaff spreaders (Deutz-Fahr), impeller blower chaff spreaders (Case IH) or hydraulically driven radial blowers (New Holland). Since the straw chopper also operates in the swath laying mode, the chaff is distributed over the operating width and the straw can be harvested without a chaff fraction.

One disadvantage of the combine proposed in EP 0 727 135 A can be seen in the fact that a broad distribution of the chaff is not possible in the swath laying mode. Although the embodiments disclosed in the two above-cited WO publications are able to operate in several modes due to the utilization of separate chaff spreaders, the chaff spreaders are relatively expensive and heavy. In the embodiment according to DE 100 64 356 A and the cited prospectuses, chaff spreaders are not required because this function is fulfilled by the straw chopper. However, problems in conveying the chaff can be expected in the embodiment according to DE 100 64 356 A because the chaff is exclusively conveyed into the straw chopper by the blower of the cleaning assembly and the suction effect of the straw chopper. In the embodiments proposed in the aforementioned prospectuses and in EP 0 727 135 A, the chaff is conveyed by blowers that usually operate with a relatively low degree of efficiency. The embodiments according to DE 100 64 356 A and the aforementioned prospectuses only allow a broad distribution of the chaff. However, it is also desirable to incorporate the chaff into the straw swath in certain applications.

SUMMARY OF THE INVENTION

It is an object of the present invention of providing an improved conveying assembly for conveying chaff to a straw chopper.

In contrast to the pneumatic conveying assemblies used in the state of the art, the invention proposes to utilize a conveying assembly that mechanically feeds the second crop residue stream from the cleaning assembly to the straw chopper. The surface of the conveying assembly mechanically acts upon the particles of the crop residue stream.

This makes it possible to reliably and easily convey the second crop residue stream into the straw chopper in an energy-saving fashion.

The conveying assembly preferably extends between the outlet side of the cleaning assembly and the inlet of the straw chopper.

For example, the conveying assembly may consist of a vibrating bottom plate that carries out an oscillating back and forward movement under the influence of a suitable drive, e.g., as is common practice in the return bottom plates of combines. The surface of the vibrating bottom plate may be smooth, roughened or provided with steps or sawtooth-like elevations. It would also be conceivable to utilize any other continuous mechanical conveyor that does not operate pneumatically, e.g., a bucket conveyor, a paddle conveyor, a chain conveyor, a belt conveyor, a roll-type conveyor and/or a screw conveyor.

The laying down of the second crop residue stream may be controlled with several straw guide plates that are arranged laterally adjacent to one another and situated downstream of the straw chopper outlet. They are able to lay down the crop residues from the straw chopper in a swath or to distribute the crop residues over approximately the operating width of the cutting mechanism of the combine. In a swath laying mode, they are also able to deflect the second crop residue stream outward to such a degree that it is laid down laterally adjacent to the swath. Consequently, the straw can be received in a baling press or the like without a chaff fraction and then conveyed to further processing.

As already described in subsequently published DE 102 49 257 A, the disclosure of which is incorporated into the present application by reference, an ejecting drum may be provided between the outlet of the separating assembly and the inlet of the straw chopper in order to improve the transport of the first crop residue stream.

The aforementioned publication also proposes a movable straw guide element that makes it possible to easily change over between the swath laying mode and the chopping mode. In the swath laying mode, the first crop residue stream preferably is conveyed along the rear side of the straw chopper. However, it would also be conceivable to convey this first crop residue stream laterally along the straw chopper. It is also possible to utilize the movable straw guide elements proposed in DE 102 19 895 A, the disclosure of which is incorporated into the present application by reference, in order to change over between the swath laying mode and the chopping mode.

BRIEF DESCRIPTION OF THE DRAWINGS

FIG. 2 is a side view of the vibrating bottom plate that conveys the chaff into the straw chopper in the combine illustrated in FIG. 1.

FIGS. 3a and 3b are schematic side and top views of the combine in a swath laying mode, wherein straw is laid down in a swath while the chaff is distributed over the operating width by means of the straw chopper.

FIGS. 4a and 4b are schematic side and top views of the combine in a swath laying mode, wherein the straw is laid down in a swath while the chaff is incorporated into the straw swath by the straw chopper.

FIGS. 5a and 5b are schematic side and top views of the combine in a straw chopping mode, wherein the straw and the chaff pass through the straw chopper and are distributed over the operating width.

DETAILED DESCRIPTION

Figure 1:
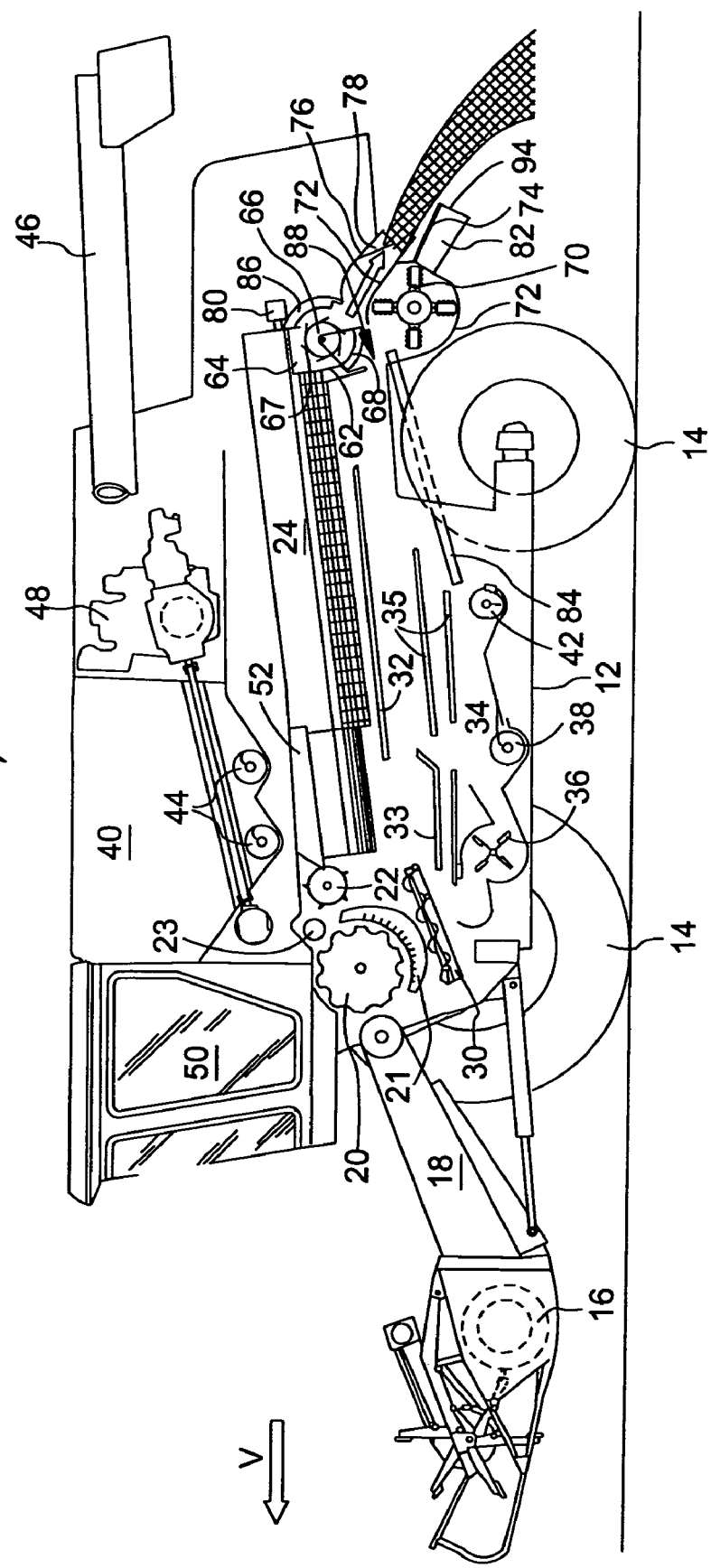
FIG. 1 is a semi-schematic side view of a combine having a transversely extending straw chopper.

FIG. 1 shows a self-propelled combine 10 with a supporting frame 12 that is supported on the ground and moved by means of driven front wheels and steerable rear wheels 14. The wheels 14 are set in rotation by a not-shown driving means in order to move the combine 10 over a field to be harvested. A harvesting assembly in the form of a cutting mechanism 16 is connected to the front end region of the combine 10 in order to harvest the crop standing in a field and to upwardly and rearwardly feed the crop to threshing and separating means via a feeder house 18. The threshing and separating means comprise a transversely arranged threshing cylinder 20 and a concave 21 associated therewith. The harvested crop is initially fed to the threshing cylinder and concave. However, it would also be conceivable to omit the transversely arranged threshing assembly 20 and 21 and utilize a rotary threshing and separating assembly that is axially arranged. In this respect, it is possible to use only one axial separator or two (or more) axial separators arranged adjacent to one another. The separating assembly could also consist of straw walkers or separating drums that are arranged downstream of a threshing assembly 20 and 21. In the illustrated combine 10, a stripping roll 23 and a fed beater 22 cooperate with a feed housing to feed the threshed crop from the threshing assembly 20 and 21 to an axial separator 24. The axial separator 24 is driven on its rear side by a gear 80. In the following description, all directions such as front, rear, above and underneath refer to the forward driving direction V of the combine 10.

The grain and the chaff separated during the threshing process fall onto at least one screw conveyor 30 that feeds the grain and the chaff to a preparation bottom plate 33. However, the grain and chaff emerging from the axial separator 24 fall onto a vibrating bottom plate 32 that conveys the grain and the chaff onto the preparation plate 33. The preparation plate 33 conveys the grain and the chaff to a cleaning assembly 34 having sieves arranged therein, wherein a blower 36 is assigned to the cleaning assembly in order to promote the separation of the chaff from the grain. The clean grain is fed to a not-shown elevator by means of a clean grain auger 38, and the elevator transports the grain into a grain tank 40. A tailings auger 42 returns non-threshed crop parts to the threshing process by means of another not-shown elevator. The chaff is ejected on the rear side of the sieves onto a vibrating bottom plate 84 that carries out an oscillating movement. The cleaned grain can be unloaded from the grain tank 40 by means of an unloading system with transverse screw augers 44 and an unloading auger 46.

The aforementioned systems are driven by an internal combustion engine 48 that is controlled by an operator from a driver cab 50. The different threshing, conveying, cleaning and separating assemblies are situated within the supporting frame 12.

A first crop residue stream that essentially comprises threshed crop residues (straw) is downwardly ejected from the axial separator 24 that serves as the separating assembly (or one of the other alternative separating assemblies mentioned above), through an outlet 64 on the underside of the rear end of the rearwardly closed axial separator 24. The crop residues fall into a vertical ejection shaft, the front of which is defined by a front wall 62. An ejection drum 66 with drivers 67 distributed over its circumference is arranged beneath the outlet 64. The rear of the ejection drum 66 is enclosed by a rear wall 86. The ejection drum 66 is set in rotation about its longitudinal axis that extends transverse to the driving direction by an assigned drive, namely in the counterclockwise direction in FIG. 1. A straw guide element 68 that can be pivoted in its entirety about the axis of rotation of the ejection drum 66 adjoins the front wall 62 at approximately half its height, namely underneath the axis of rotation of the ejection drum 66. The straw guide element 68 can be pivoted about this axis between the swath laying position illustrated in FIGS. 1, 3a and 4a and the chopping position illustrated in FIG. 5a.

A generally known straw chopper 70 is arranged in a housing 72 beneath and slightly to the rear of the ejection drum 66. This straw chopper can be set in rotation (in the counterclockwise direction in the figures) about a horizontal axis that extends transverse to the driving direction by means of a suitable drive and said chopper comprises a cylindrical body with chopping knives suspended thereon in a pendulum fashion. These chopping knives cooperate with stationary knives arranged in the housing 72 in order to chop and distribute the crop residues on the field over approximately the cutting width of the cutting mechanism 16 by means of a straw distributing shroud 74 that is equipped with straw guide plates 82. One part of the housing 72 extends above the straw chopper 70 in the form of a circular arc, namely from the front end of the straw distributing shroud 74 to a point that approximately lies above the axis of rotation of the straw chopper 70 as shown in FIGS. 1, 3a, 4a and 5a.

The straw guide element 68 is curved in a concave fashion (and in the shape of a circular arc) and concentrically surrounds the ejection drum 66 for an angle of approximately 45 degrees. The straw guide element is coupled to the supporting frame 12 of the combine 10 in a pivoted fashion on its outer ends in the transverse direction. In the swath laying position shown and FIGS. 1, 3a and 4a, the straw guide element 68 extends from the front wall 62 to a point that approximately lies above the axis of rotation of the straw chopper 70. In this position, the straw guide element 68 conveys the threshed crop residues from the ejection drum 66 transversely rearward and downward beneath the ejection shroud 76. The underside of the ejection shroud 76 is, just like the straw distributing shroud 74, provided with straw guide plates 78 in order to define the width of the swath of crop residues being laid down.

The vibrating bottom plate 84 extends rearward and upward from the lower rear end of the cleaning assembly 34 to a chopper inlet 88 that is in the form of an opening between the lower end of the front wall 62 of the ejection shaft and the upper end of the housing 72 of the straw chopper 70, wherein said opening extends over the width of the ejection shaft and the straw chopper 70. According to FIG. 2, the vibrating bottom plate 84 is connected to a suitable drive, such as a cam, so that it carries out an oscillating back and forward movement along its longitudinal direction similar to the vibrating preparation plate 32. This is indicated by the arrows 92. The vibrating bottom plate 84 is provided with sawtooth-shaped steps 90 as shown in FIG. 2 or another suitable surface structure. This causes the chaff and other chopped straw fractions which are delivered onto the vibrating bottom plate 84 from the rear end of the cleaning assembly 34 under the influence of the blower 36 and through gravitational force in the form of a second crop residue stream to travel rearward and upward on the vibrating bottom plate 84 until they are conveyed through the opening 88 and into the straw chopper 70.

The straw chopper 70 also operates in the position of the guide plate 68 illustrated in FIGS. 1, 3a and 4a. In this case, the straw chopper conveys the chaff and the chopped straw fractions, wherein the conveying effect suffices for conveying the chaff and the chopped straw fractions along the straw guide plates 82 and for ejecting them behind the combine 10 onto the field.

The straw guide plates 82 of the straw distributing shroud 74 are coupled to the straw distributing shroud 74 such that they can be pivoted about axles 94 that extend transverse to their longitudinal axis and the crop conveying direction. The pivoting axles are approximately situated on the rear ends of the straw guide plates in the embodiment shown. The straw guide plates 82 can be adjusted manually or in a remote-controlled fashion from the driver cab 50, namely by means of suitable actuators in the form of electric or hydraulic motors that, in particular, are controlled by suitable sensors that automatically ensure the desired width of distribution. The straw guide plates 82 can be moved in this fashion between the broad laying position shown in FIG. 3b and the swath laying position shown in FIG. 4b.

In the broad laying position (FIG. 3b), the rear ends of the straw guide plates 82 point outward and the two central straw guide plates 82 contact one another on their front ends such that the chaff is prevented from being conveyed into the swath and the chaff is distributed on both sides and outside the swath of straw laid down in the swath laying mode, namely over approximately the width of the cutting mechanism 16. The arrows in FIG. 3b indicate that the straw can be harvested without a chaff fraction.

In the swath laying position (FIG. 4), the straw guide plates 82 extend in the forward driving direction V of the combine 10. The chaff is blown into the straw swath in the form of a swath, the width of which approximately corresponds to the width of the straw swath, such that a swath consisting of a straw/chaff mixture is laid down as indicated in FIGS. 4a and 4b. The chaff could also be laid down beneath the straw swath by manually or mechanically pivoting the straw distributing shroud 74 downward about the horizontal axle that extends transverse to the forward driving direction V at its coupling point on the housing 72 of the straw chopper 70.

In the swath laying mode, it would also be conceivable to move the straw guide plates 82 into a position, in which the chaff is distributed over the field. In this case, part of the chaff also is laid down underneath the straw swath analogous to the position illustrated in FIG. 5b.

In the chopping position, the straw guide element 68 is pivoted rearward (in the clockwise direction referred to FIG. 1) about the axis of rotation of the ejector drum 66 as shown in FIG. 5a. This causes an opening to be formed between the front wall 62 and the front edge of the straw guide element 68, wherein the crop residues are introduced into the straw chopper 70 through this opening. In this position, the straw guide element 68 extends the rear wall 86 downward and forward. If the straw guide element is in the swath laying position, the front wall 62, in its region below the line at which the straw guide element 68 adjoins, could also be provided with guide skids 84 in order to introduce the crop residues into the straw chopper 70 in the most uniform fashion possible. The straw and the chaff are chopped in the straw chopper 70 and ejected transversely rearward and downward such that they are distributed on the field over the operating width of the cutting mechanism 16 as indicated by the arrows in FIG. 5b.

The straw guide element 68 can be moved between the swath laying position and the chopping position by means of a manually actuated mechanism or suitable motors that are preferably remote-controlled from the driver cabin 50. It would be conceivable to provide buttons or menus that make it possible to simultaneously adjust the straw guide element 68 and the straw guide plates 82 such that any of the operating positions of the straw guide element 68 and the straw guide plates 82 which are illustrated in FIGS. 3, 4 and 5 can be selected by pressing only one button or selecting only one operating mode on a screen.

Having described the illustrated embodiment, it will become apparent that various modifications can be made without departing from the scope of the invention as defined in the accompanying claims.

The invention claimed is:

1. A combine having a driving direction, comprising:
   a separating assembly providing a first crop residue stream;
   an ejector for receiving the first crop residue stream from the separating assembly, the ejector further comprising a straw guide element movable between two positions, a first chopping mode position for directing the first crop residue stream to a first opening substantially across the width of the top front end of a straw chopper, and a second swath forming mode position for conveying the first crop residue stream around the top of the straw chopper, and downward beneath an ejection shroud, laying the first crop residue stream in a swath, the ejection shroud having movable guide plates used to define the width of the swath;

a cleaning assembly which mechanically conveys a second crop residue stream upward and rearward to a second opening extending substantially across the width of the upper front end of the straw chopper, below the first opening therein, the second crop residue stream being fed through the second opening down into the straw chopper by gravitational means;

the straw chopper receiving at least the second crop residue stream, and the first crop residue stream when the straw guide element is in the first chopping mode position, the straw chopper chopping the crop residue and directing the chopped crop residue stream out an outlet at the rear of the straw chopper; and a straw distributing shroud for receiving the chopped crop residue stream from the straw chopper outlet, and ejecting the chopped crop residue behind the combine, the straw distributing shroud having straw guide plates movable to adjust the width of the ejected chopped crop residue stream.

2. The combine as defined by claim 1 wherein the cleaning assembly comprises a vibrating bottom plate having an oscillating movement.

3. The combine as defined by claim 1 wherein the chopped crop residue stream can be laid down in a swath when the straw guide plates are in the swath forming mode position.

4. The combine as defined by claim 1 wherein the movable guide plates on the ejection shroud can be adjusted to a swath laying position, in which the first crop residues are laid down in a swath.

5. The combine as defined by claim 4 wherein the straw guide plates can be moved into a position, in which the chopped crop residue stream can be broadly distributed outside the swath of the first crop residue stream when the straw guide element is in swatch mode.

6. The combine as defined by claim 1 wherein the ejector can be set in rotation about an ejector axis.

7. The combine as defined by claim 6 wherein the straw guide element can be pivoted about an axis that lies parallel to and coincides with the ejector axis and extends horizontally transverse to the driving direction of the combine.

8. The combine as defined by claim 1 wherein the chopped crop residue stream is distributed over an operating width of the combine by the straw chopper when the straw guide plates are in the broad distributing position.

9. The combine as defined by claim 1 wherein the movable guide plates on the ejection shroud can be adjusted to a broad distributing position, in which the first crop residue is distributed over an operating width of the combine.

10. The combine as defined by claim 1 wherein when the straw guide element is in the swath forming mode, the ejection shroud guide plates are adjusted to direct the swath on top of the ejected chopped crop residue.

11. The combine as defined by claim 1 wherein when the straw guide element is in the swath forming mode, the ejection shroud guide plates are adjusted to direct the swath to either side of the ejected chopped crop residue.

* * * * *